UNITED STATES PATENT OFFICE.

LUDWIG OTTO HELMERS, OF HAMBURG, GERMANY, ASSIGNOR TO THE ICHTHYOL - GESELLSCHAFT CORDES, HERMANNI & COMPANY, OF SAME PLACE.

THERAPEUTICAL COATING.

SPECIFICATION forming part of Letters Patent No. 478,106, dated July 5, 1892.

Application filed February 7, 1891. Serial No. 380,611. (No specimens.)

*To all whom it may concern:*

Be it known that I, LUDWIG OTTO HELMERS, doctor of philosophy, a subject of the German Emperor, residing at Hamburg, in the German Empire, have invented certain new and useful Improvements in Coatings for Therapeutical Purposes, of which the following is a specification.

My invention relates to an improved coating for therapeutical purposes into which the remedy is incorporated. Heretofore such coatings used in medicine as carriers of the remedy to be applied to the injured part of the body either could not be washed off the latter by water or they caused, by secondary action, irritation or inflammation.

The object of this invention is to avoid such inconveniences and to prepare a hermetical covering, coating, or carrier of the remedy the removal of which may be easily effected.

To carry this invention into practice, the medicament in solid form or in solution is thoroughly mixed with a corresponding portion of pure starch or substances containing starch, and to keep the said mass homogeneous certain portions of albumen, caseine, or other similar-acting substances have to be added. In order to obtain a homogeneous mass for a coating of the desired properties, the starch is preferably mixed with cold water in the proportion of about half of its own weight, because when thus moistened it will mix better with the medicament.

According to this invention, for instance, an ichthyol coating may be obtained as follows: Pure wheat-starch is sprinkled with half of its weight of water and thoroughly mixed with an equal weight of ichthyol. One to 1.5 per cent. of a concentrated solution of albumen is then added, whereupon the mixture is triturated again until it has attained a homogeneous condition, in which it may be applied to the injured part of the body.

A glycerine coating is obtained by mixing in the same manner about thirty per cent. of glycerine with thirty per cent. of starch-meal, fifteen per cent. of water, and twenty-five per cent. of gum-arabic; or forty per cent. of glycerine is mixed with forty per cent. of starch-meal and twenty per cent. of a concentrated solution of caseine, to which, if desired, about 0.5 per cent. of carbolic acid may be added.

In a similar way a chloride-of-calcium coating is prepared by mixing about forty per cent. of a solution of chloride of calcium (containing fifty per cent. of the salt) together with forty per cent. of starch-meal, ten per cent. of water, and ten per cent. of a concentrated solution of albumen.

When a coating having antiseptic properties is to be prepared, in place of albumen, caseine, or the like such antiseptic substances may be used, as, for instance, carbolic acid, which will prevent the starch settling in the water. A coating of such a nature may be obtained by mixing together fifty parts of starch-meal, 22.5 parts of water, 2.5 parts of carbolic acid, and twenty-five parts of ichthyol.

Having now fully described my invention, what I claim, and desire to secure by Letters Patent, is—

1. The herein-described coating for therapeutic purposes, consisting of starch, water, and ichthyol in about the proportions set forth.

2. The herein-described coating for therapeutic purposes, consisting of starch, water, ichthyol, and carbolic acid in about the proportions set forth.

In testimony that I claim the foregoing as my invention I have signed my name, in presence of two witnesses, this 12th day of January, 1891.

LUDWIG OTTO HELMERS.

Witnesses:
 ALEXANDER SPECHT,
 DIEDRICH PETERSEN.